United States Patent
Sharifi et al.

(10) Patent No.: US 11,924,149 B2
(45) Date of Patent: Mar. 5, 2024

(54) COMPOSITION OF COMPLEX CONTENT VIA USER INTERACTION WITH AN AUTOMATED ASSISTANT

(71) Applicant: Google LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 163 days.

(21) Appl. No.: 16/949,150

(22) Filed: Oct. 15, 2020

(65) Prior Publication Data
US 2022/0124055 A1    Apr. 21, 2022

(51) Int. Cl.
*H04L 51/02* (2022.01)
*G10L 15/06* (2013.01)
*G10L 15/22* (2006.01)

(52) U.S. Cl.
CPC ............ *H04L 51/02* (2013.01); *G10L 15/063* (2013.01); *G10L 15/22* (2013.01); *G10L 2015/0631* (2013.01); *G10L 2015/223* (2013.01)

(58) Field of Classification Search
CPC ....... H04L 51/02; G10L 15/063; G10L 15/22; G10L 2015/0631; G10L 2015/223; G10L 15/26; G06F 3/167
See application file for complete search history.

(56) References Cited

U.S. PATENT DOCUMENTS

| | | | |
|---|---|---|---|
| 9,772,816 B1 * | 9/2017 | Bigham | G06F 3/167 |
| 10,594,757 B1 * | 3/2020 | Shevchenko | G10L 15/197 |
| 2011/0172989 A1 | 7/2011 | Moraes | |
| 2014/0120961 A1 * | 5/2014 | Buck | G06F 1/329 455/466 |

(Continued)

FOREIGN PATENT DOCUMENTS

WO    2005031995    4/2005

OTHER PUBLICATIONS

Jen et al., "Annotated Template? (aka Template with Guidelines)—Microsoft Community", retrieved from the internet: URL:https://answers.microsoft.com/en-us/msoffice/forum/all/annotated-template-akak-template-with-guidelines/5c0d773e-075e-4c15-8718-96baca36c22c; 2 pages; dated Jul. 17, 2012.

(Continued)

*Primary Examiner* — Andrew C Georgandellis
(74) *Attorney, Agent, or Firm* — Gray Ice Higdon

(57) ABSTRACT

Implementations set forth herein relate to an automated assistant that facilitates the creation of complex messages from user input(s) to the automated assistant. Each message can be created according to a respective template that is selected based on user input that directs the automated assistant to communicate a message to a recipient. Furthermore, sections of a template can be designated for certain content based on prior messages communicated by one or more users to one or more recipients. In this way, in response to a user requesting that the automated assistant send a message, the automated assistant can select a related template and fill out the template accordingly. In some instances, content that is assigned to certain sections of the selected template can come from a variety of different sources and/or may not be explicitly specified in the request from the user to the automated assistant.

20 Claims, 6 Drawing Sheets

(56) References Cited

U.S. PATENT DOCUMENTS

| | | | | |
|---|---|---|---|---|
| 2014/0343950 | A1* | 11/2014 | Simpson | G06F 16/9535 |
| | | | | 704/275 |
| 2016/0012031 | A1* | 1/2016 | Narasimhan | H04L 51/046 |
| | | | | 715/224 |
| 2017/0192953 | A1* | 7/2017 | Miklos | G06F 40/186 |
| 2019/0034403 | A1* | 1/2019 | Pal | G06F 40/194 |
| 2019/0073693 | A1* | 3/2019 | Moukaddem | G06F 40/131 |

OTHER PUBLICATIONS

Anonymous, "Template (word processing)—Wikipedia"; retrieved from the internet: URL:https://en.wikipedia.org/w/index.php?title=Template_(word_processing)&oldid=950107250; 4 pages; dated Apr. 10, 2020.

Anonymous, "Template (file format)—Wikipedia", retrieved from the internet: URL:https://en.wikipedia.org/w/index.php?title=Template_(file_format)&oldid=976509465; 2 pages; dated Sep. 3, 2020.

European Patent Office; International Search Report and Written Opinion issued in PCT Application No. PCT/US2021/054576; 26 pages; dated Jan. 31, 2022.

Intellectual Property India; Examination Report issued for Application No. 202227064637, 7 pages, dated Sep. 20, 2023.

* cited by examiner

COMPOSITION OF COMPLEX CONTENT VIA USER INTERACTION WITH AN AUTOMATED ASSISTANT

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests using spoken natural language input (i.e., utterances) which may in some cases be converted into text and then processed, and/or by providing textual (e.g., typed) natural language input.

An automated assistant can allow a user to send a text message to certain recipients by providing a spoken utterance that identifies a recipient and any content for the text message. However, when the user desires to communicate a more complex message, the automated assistant may not be able to handle any additional layers of complexity. As a result, the user may rely on a keyboard interface when one is available, in order to draft a message with a more complicated structure. Oftentimes, this can extend an amount of time that may be necessary to create a message, and can also consume additional computational resources.

In some instances, a user that repeatedly drafts similar messages may rely on a messaging application (e.g., a browser that provides email access) in order to draft such messages. The user may manually review past messages in order to glean a preferred structure for a message that the user is currently drafting. However, this process can waste considerable computational resources and time, depending on how often the user creates such similar messages. Furthermore, although a user can employ speech-to-text features of their respective computing device in order to streamline certain aspects of message drafting, such features can be limited to commands that involve transcribing speech of a user to natural language content for a message.

SUMMARY

Implementations set forth herein relate to an automated assistant that can create content templates for fulfilling requests from a user. Furthermore, and in response to a request, the automated assistant can select a particular template based on content of the request and/or a context of the request. For instance, a user can provide a request for the automated assistant to compose a message for updating a colleague(s) on the progress of a project and, in response to the request, the automated assistant can select a "project" template. The project template can be generated by the automated assistant based on prior instances in which the user caused project-related messages to be generated (e.g., via a messaging application or other service and/or application). The automated assistant can select the project template by processing content of the request from the user, contextual data characterizing a context in which the user provided the request, and/or the templates that are available to the automated assistant.

For example, the request from the user can be a spoken utterance such as, "Assistant, send the managers an update on the progress of the project but don't make the message urgent." In response, the automated assistant can process audio data corresponding to the spoken utterance in order to identify a template that will be most effective for fulfilling the request from the user. For instance, the audio data can be processed using one or more trained machine learning models in order to generate an embedding that can be mapped to a latent space. Each template can also be processed to generate other embeddings that can be mapped to the latent space. A distance between embeddings in the latent space can be determined for each template and the embedding corresponding to the audio data and/or a transcription (e.g., via automated speech recognition) of the audio data. A particular template embedding that is determined to have a distance (e.g., a Euclidian distance) that is closest to the embedding corresponding to the audio data can be selected for fulfilling the request from the user. Alternatively, or additionally, a particular template can be selected according to a heuristic process and/or a semantic understanding of each available template. For example, a semantic understanding of annotations stored with each available template can be determined by the automated assistant in order to determine a relevance of each available template to a request from the user. A particular template that is determined to be most relevant to the request can then be selected for fulfilling the request from the user.

When the automated assistant has selected a particular template in response to the aforementioned request, the automated assistant can initialize completion of the particular template according to the request and/or any other information associated with the particular template. For example, a template can have dynamic and/or static sections that can be completed according to content of the request and/or one or more other sources of data. A static section of the template can correspond to natural language content that is incorporated into the template each time the template is selected. A dynamic section of the template can correspond to content that is identified for inclusion in the template based on one or more requests from a user and/or a circumstance associated with the one or more requests. Alternatively, or additionally, the dynamic content can be explicitly identified by the user when providing one or more requests associated with the template.

As an example, and in response to the aforementioned spoken utterance from the user, the template that is selected can be the "project" template, which can include static content such as, "Good morning, attached is an update on the progress of the project." Additionally, the "project" template can include a dynamic section, such as a document address field for attaching a progress report document. The document address field can be a dynamic section because the automated assistant can assign a different value to the document address field each time the automated assistant accesses the "project" template in response to a user request. In some implementations, the dynamic section can be assigned a value and/or other content based on annotations stored in association with a corresponding template. Alternatively, or additionally, the dynamic section can be assigned a value and/or other content based on a context in which the user is accessing the corresponding template. For example, the automated assistant can process annotations and/or contextual data associated with the selected "project" template in order to identify an address of a particular file to reference in the "project" template message from the user. In some instances, the processing can result in a score for a variety of different file addresses, and a file address with a score that satisfies a particular threshold can be referenced in the message being created according to the "project" template. For example, when the user has a history of accessing a most-recently modified document (e.g., a progress report for a most recent project) in a particular folder when creating messages that provide the basis for the "project" template, this history of the user can be described, with prior permission from the user, in annotations stored in association with the "project" template. As a result, processing of the annotations can result in the automated assistant selecting, from the particular folder, a most-recently modified document to attach to the "project" template message.

In some implementations, natural language content for a message that is based on an automated assistant template can be generated in accordance with a selected tone for the message. For example, a variety of different messages that are the basis for a particular template can be processed in order to identify differences in tone between the different messages and/or determine why each particular tone was used by a respective author of a respective message. For example, multiple different messages can be processed in order to generate a particular template, and a tone of the particular template-based message can be selected according to data that is stored in association with the particular template. For instance, and in accordance with the aforementioned example, the automated assistant can generate a "project" template message with a non-urgent tone because the user instructed the automated assistant to "[not] make the message urgent." As a result, the automated assistant can omit an express indication in the "project" template message that any due date is impending. However, when the automated assistant determines that the attached project report includes language characterizing an urgent deadline, the automated assistant can draft the "project" template message with an urgent tone.

For example, the automated assistant can process language in the attachment, the spoken utterance, the "project" message template, and/or other contextual data to infer whether to incorporate language that corresponds to a certain tone. When the automated assistant determines to draft with an urgent tone, the "project" template message can include natural language content such as, "Good morning, attached is an update on the progress of the project that is quickly coming due." However, when the automated assistant determines to draft without an urgent tone, the "project" template message can include natural language content such as, "Good morning, attached is an update on the progress of the project," without the phrase "that is quickly coming due." In some implementations, iterations of the "project" template message can be generated and processed in order to determine whether a particular iteration corresponds to a particular tone. Each message iteration can be characterized by a score and/or embedding that corresponds to the tone for the message iteration. A threshold score can be established based on content of a spoken utterance from the user, a selected template, and/or other information; and when a message iteration results in a score and/or embedding that satisfies the threshold score, the message iteration can be selected for communicating to a recipient.

In some instances, a user can have an expectation regarding whether or not a recipient of content will or should reply to certain content created by the user. In some implementations, this expectation can be gleaned from prior content that forms the basis for a particular template. For example, a user can be tasked with creating a post every month for an upcoming event that is hosted by the user. Posts that have been created by the user and/or another user(s) can be processed by the automated assistant in order to create one or more post templates. Furthermore, messages received by the user in response to a particular post can be analyzed to determine how content of each respective post has resulted in certain kinds of received messages over other kinds of received messages. In this way, the automated assistant can generate particular content according to the type(s) of response(s) the user would like to receive for the particular content.

As an example, the user can provide a spoken utterance such as, "Assistant, create a yoga class post, and ask people to confirm 24 hours before the class." In response, the automated assistant can select a currently available "yoga class" template, and generate content based on the selected "yoga class" template, the spoken utterance from the user, and/or a context of the spoken utterance. For example, in response to the spoken utterance from the user, the automated assistant can determine that the "yoga class" template is most relevant to the spoken utterance. The automated assistant can then generate content for the "yoga class" template in accordance with the spoken utterance and/or any other information stored in association with the "yoga class" template. Furthermore, the automated assistant can modify a dynamic section of the "yoga class" template in order to satisfy the request from the user to "ask people to confirm 24 hours before class." The automated assistant can modify the dynamic section according to template annotations and/or prior instances in which the user created posts that included a request for confirmations and those confirmations were actually received. In other words, any natural language content that is generated to satisfy the request from the user to "ask people to confirm 24 hours before class" can be selected to increase a probability that confirmations will be received. For example, the dynamic section can be updated by the automated assistant to include a statement such as, "Please confirm your reservation by [class date−24 hours]," instead of a different statement that has historically resulted in less confirmations (e.g., "RSVP 24 hours before.").

In some implementations, the automated assistant can selectively provide the user with an ability to edit content that is created based on an automated assistant-generated template. For example, when the automated assistant determines that content generated using a selected template is suitable for use when performing one or more operations, the automated assistant can determine whether to prompt the user to confirm the one or more operations. Alternatively, or additionally, the automated assistant can provide the user with an opportunity to edit the content prior to performing the one or more operations using the template-based content. For example, in some implementations, data stored in association with a template can indicate whether or not the automated assistant should prompt the user regarding certain template-related actions. For instance, a particular action can involve allowing template-based content (e.g., the aforementioned "yoga class" post) to be published to an additional user(s). Furthermore, one or more annotations, stored in association with the template that is based on previous instances of content, can indicate that the user had typically performed one or more reviews of the content prior to taking one or more particular actions with the content. Based on the one or more annotations of the template, the automated assistant can prompt the user regarding confirming the automated assistant initializing performance of the one or more operations (e.g., making the "yoga class" post publicly available).

Alternatively, or additionally, other data stored in association with another template can indicate that the user did not typically perform multiple reviews of other content that provided the basis for the other template (e.g., an "informal message" template). Based on this other data, the automated assistant can omit a step of prompting the user to confirm performing certain operations (e.g., sending an informal message to a recipient) with certain content that is generated using the other template. In some implementations, the other data stored in association with the other template can indicate that the user preferred to perform multiple reviews of prior content for certain recipients of the prior content. As a result, when a request from a user invokes the automated assistant to access the other template and use the other template for sending content to a particular recipient, the automated assistant can prompt the user regarding editing the content depending on the particular recipient.

In some implementations, the automated assistant can generate a template based on prior instances in which one or more users created similar content. Therefore, over time the automated assistant can have a variety of different templates to access in order to create complex content in response to a request from a user. In order to initialize generation of a particular template, one or more instances of content embodied in one or more documents can be processed to determine a similarity score for the instances of content. When two or more instances of content (e.g., two or more emails) are determined to have a similarity score that satisfies a threshold similarity, the automated assistant can initialize generation of a particular template. The particular template can incorporate one or more sections that can be customized in response to a user providing a request that causes the automated assistant to select the particular template for use when fulfilling the request. In some implementations, each section can be a static section, whose content can be selected from one or more different content options, or a dynamic section, whose content can contingent upon one or more dynamic data sources. For example, data stored in association with the particular template can identify one or more different content options for a static section. Furthermore, the data can indicate when a particular content option should be selected over another content option (e.g., based on a user request, a context of the request, and/or any other information associated with the request).

In some implementations, data stored in association with the particular template can identify one or more dynamic data sources that can be used as a basis for supplementing certain content of a dynamic section of the particular template. Alternatively, or additionally, a particular dynamic value can be selected as a basis for generating certain template-based content. This particular dynamic value can be used by the automated assistant to generate separate content, which can be incorporated into the dynamic section without explicitly incorporating the particular dynamic value into the template-based content. For example, a dynamic section of a particular template can be assigned a value that is based on a meteorological website that indicates a dominant wind direction for a current day. However, data stored in association with the particular template that can direct the automated assistant to supplement the dynamic section with a value that is the opposite direction of the dominant wind direction indicated on the meteorological website. In this way, when the particular template corresponds to a "windmill message" template, a dynamic section embodied in a particular portion of the "windmill message" template can be based on the meteorological website without requiring that the user directly access the meteorological website. In other words, the user can provide a request to the automated assistant such as, "Assistant, send a message to today's windmill foreman," and, in response, a portion of message content generated by the automated assistant can include a sentence such as, "Based on today's weather, we should be aiming in a northwest direction" (e.g., when the meteorological website indicates that the dominant wind direction is southeast). This can preserve computational resources that might otherwise be consumed when a user is switching between various applications in a foreground of a computing device in order to gather data to generate a particular message.

The above description is provided as an overview of some implementations of the present disclosure. Further description of those implementations, and other implementations, are described in more detail below.

Other implementations may include a non-transitory computer-readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
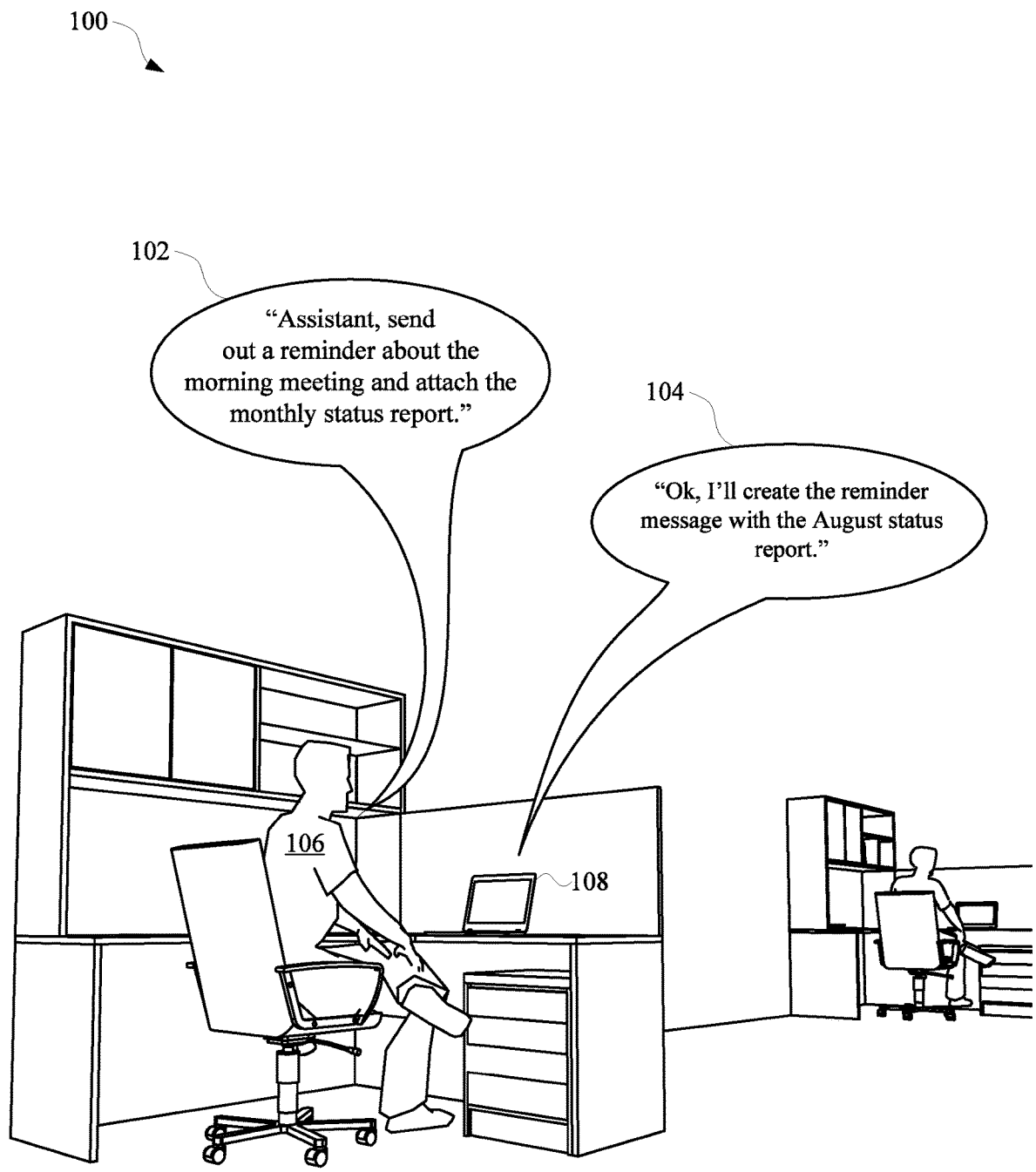
FIG. 1A and FIG. 1B illustrate views of a user providing a request to an automated assistant, in order to cause the automated assistant to generate a complex message from a template.
Figure 1B:
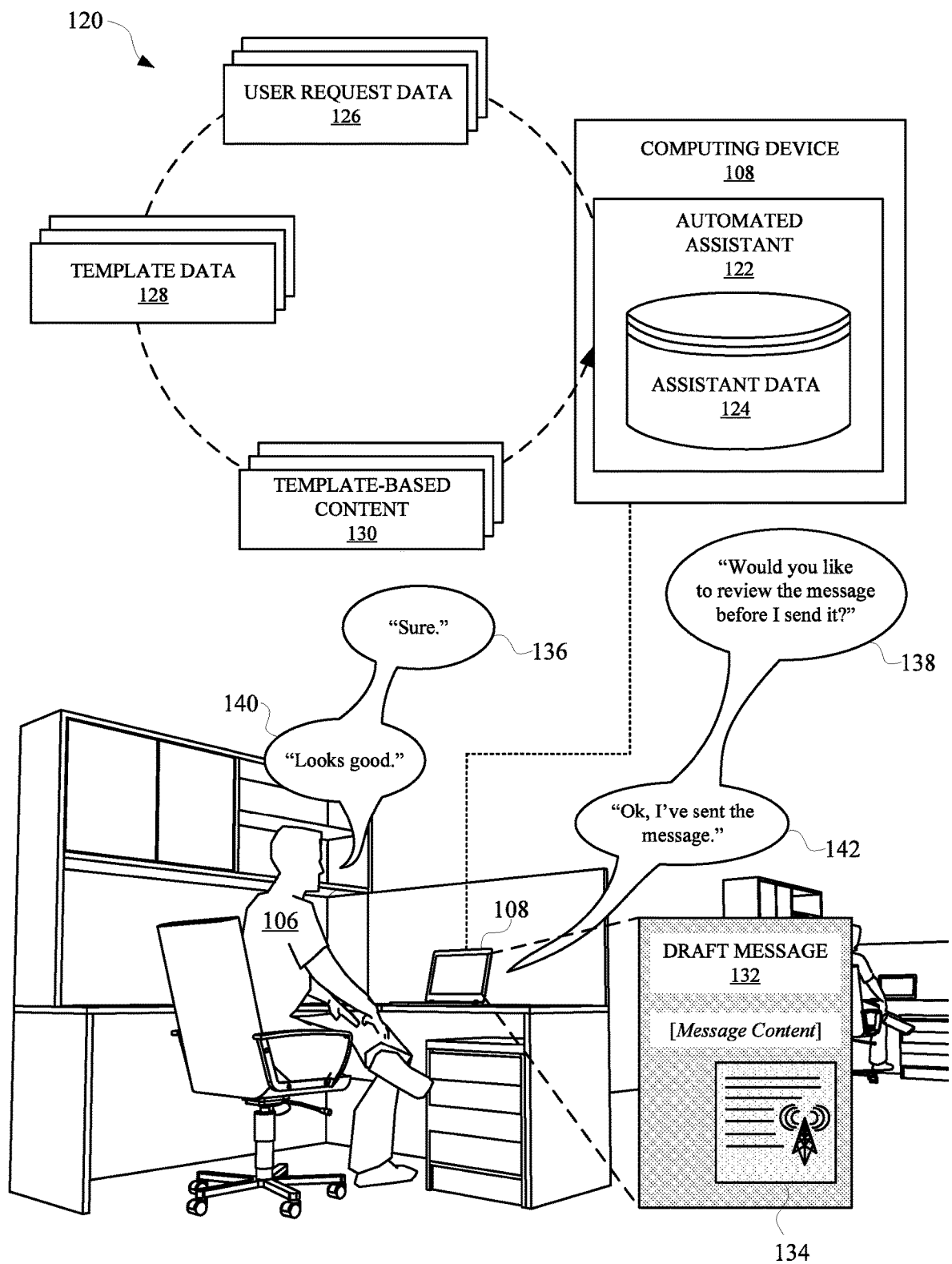

FIG. 1A and FIG. 1B illustrate a view 100 and a view 120 of a user 106 providing a request 102 to an automated assistant 122, in order to cause the automated assistant 122 to generate a complex message from template data 128. For example, the user 106 can provide a request 102 such as, "Assistant, send out a reminder about the morning meeting and attach the monthly status report." In response to receiving the request 102, the automated assistant 122 can optionally provide an acknowledgement 104 indicating that the request 102 was understood by the automated assistant 122 and/or will be acted upon. In order to fulfill the request 102 from the user 106, the automated assistant 122 can process user request data 126 corresponding to the request 102 in order to determine whether to select a particular template to assist with fulfilling the request 102. For example, in some implementations, the automated assistant 122 can bypass using a template to fulfill a request 102 when an amount of time and/or computational resources consumed when fulfilling the request 102 would be reduced without selecting a template. In some implementations, the automated assistant 122 can process an incoming request using one or more trained machine learning models in order to determine a relationship (e.g., one or more relationship scores and/or ranks respective to various different templates) between the incoming request and an available template(s). When the automated assistant 122 determines that the determined relationship does not satisfy a threshold for employing a particular template, the automated assistant 122 can determine whether to generate a template for the particular request and/or operation to fulfill the incoming request. Otherwise, when the automated assistant 122 determines that the relationship does satisfy a relationship threshold for a particular template, the automated assistant 122 can employ the template for fulfilling the incoming request.

Based on the processing of the user request data 126, the automated assistant 122 can select a template based on template data 128, which can characterize content templates and/or data stored in association with the content templates. In some implementations, when fulfilling the request 102 includes communicating content to one or more recipients, a template that is selected by the automated assistant 122 can be selected based on the one or more recipients. For example, when fulfilling the request 102 involves communicating template-based content 130 to a first recipient, then a first template can be selected, and when fulfilling the request 102 involves communicating template-based content 130 to a second recipient, then a second template can be selected. Alternatively, or additionally, content of the request 102 and/or a context in which the request 102 is provided can be a basis for selecting a particular template. For example, when the phrase "morning meeting" is embodied in a request that is provided during morning hours, the automated assistant 122 can determine that a "morning meeting" template is most relevant to the request. However, when a request is not provided in morning hours and/or does not include the phrase "morning meeting," the automated assistant 122 can determine that the "morning meeting" template is not relevant to the request—at least compared to other available content templates.

When the automated assistant 122 has selected a particular template to use for fulfilling the request 102 from the user 106, the automated assistant 122 can identify and/or generate content to include in the template. In some implementations, the user 106 can provide the request 102 to a computing device 108, and the automated assistant 122 can be accessed via the computing device 108. The automated assistant 122 can identify content for the selected template via this computing device 108 and/or one or more other devices that are in communication with the computing device 108. For example, the computing device 108 can provide access to messages that the selected template is based upon. Using these prior messages, the automated assistant 122 can process various content of the prior messages in order to score and/or rank particular content to incorporate into the selected "morning meeting" template.

For example, a section of a draft message 132 that is based on the selected template can be intended for certain "message content," such as a greeting, a reference to a recipient, a comment about an attachment, and/or any other content that can be incorporated into a message. These content options can be based on prior messages from the user 106 and/or other similar messages communicated by other users. The automated assistant 122 can then score these options by, for example, generating embeddings for each option and determining their distance in latent space to one or more embeddings associated with the request 102. For example, one or more other embeddings can be generated using one or more trained machine learning models and content of the request 102, contextual data, and/or any information that can be associated with the request 102. Respective distances in latent space between content option embeddings and the other embeddings associated with the request 102 can be determined in order to identify content options that are most suitable for incorporating into the draft message 132. For example, a distance that satisfies a threshold can indicate that a corresponding content option should be selected over other content options for inclusion into the draft message 132 and/or the identified template.

In some implementations, the automated assistant 122 can access a stored knowledge graph to determine whether certain content should be incorporated into a template. The stored knowledge graph can include, with prior permission from the user 106, references to various files, applications, locations, media, and/or any other information that is associated with the user 106. In this way, the automated assistant 122 is able to identify other content that may be used to fulfill the request 102 from the user 106, and supplement the template-based content 130. For example, the knowledge graph can indicate that a recent file created by the user 106 includes the phrase "status report." Based on this indication, the automated assistant 122 can determine that the recent file is a candidate for content to assign to a section of the identified template. Alternatively, or additionally, the automated assistant 122 can determine that the template includes a section for attaching a file, and can score one or more different files according to a relevance of each respective file to the request 102. A file that is determined to be most relevant to the request 102 can be assigned to the identified template and incorporated into the draft message 132 as an attachment 134.

In some implementations, the automated assistant 122 can determine whether or not to prompt a user 106 regarding whether the user 106 would like to edit the draft message 132 prior to communicating the draft message 132 to particular recipients. The automated assistant 122 can base this determination on the request 102, the identified template, a context in which the request 102 and/or prior messages were generated, and/or any other information that can provide a basis for prompting a user regarding editing a draft message. For example, the automated assistant 122 can render an audible prompt 138 via the computing device 108 such as, "Would you like to review the message before I send it?" In response, the user 106 can provide a spoken utterance 136 such as "Sure," then review the draft message 132 via their computing device 108, and then provide an additional spoken utterance 140 such as "Looks good." In response to the additional spoken utterance 140, the automated assistant 122 can render an additional output 142 such as, "Ok, I've sent the message," thereby confirming that the draft message 132 and/or the template-based content 130 has been communicated in response to the request 102.

Figure 2:
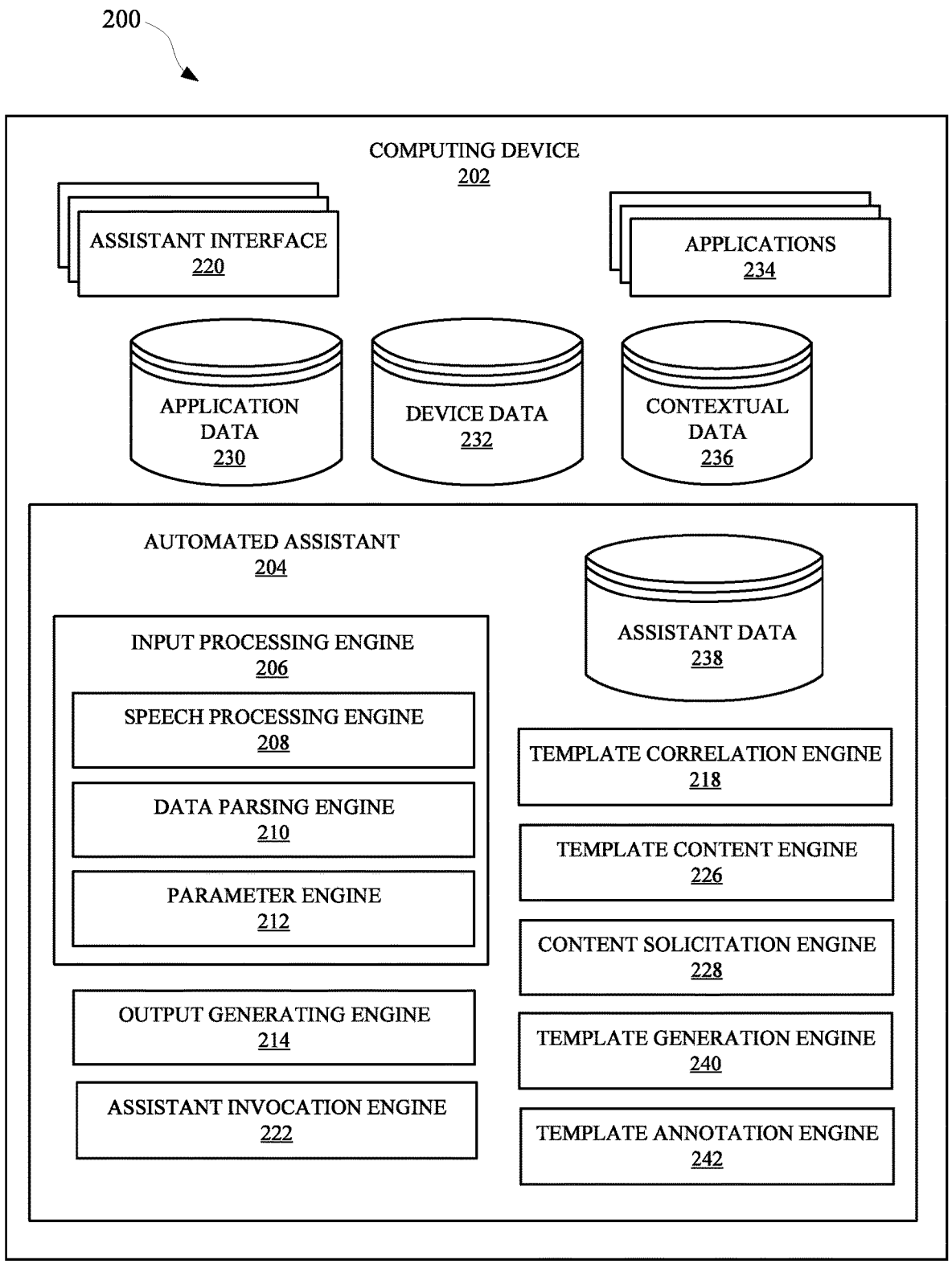
FIG. 2 illustrates a system that allows an automated assistant to generate complex content using templates that can, optionally, be generated from existing instances of content.

FIG. 2 illustrates a system 200 that allows an automated assistant 204 to generate complex content using templates that can, optionally, be generated from existing instances of content. The automated assistant 204 can operate as part of an assistant application that is provided at one or more computing devices, such as a computing device 202 and/or a server device. A user can interact with the automated assistant 204 via assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to initialize one or more actions (e.g., provide data, control a peripheral device, access an agent, generate an input and/or an output, etc.). Alternatively, the automated assistant 204 can be initialized based on processing of contextual data 236 using one or more trained machine learning models. The contextual data 236 can characterize one or more features of an environment in which the automated assistant 204 is accessible, and/or one or more features of a user that is predicted to be intending to interact with the automated assistant 204. The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented at the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the application state engine in order to determine a suitable action to initialize via the automated assistant 204.

The computing device 202 can further include an assistant invocation engine 222 that can use one or more trained machine learning models to process application data 230, device data 232, contextual data 236, and/or any other data that is accessible to the computing device 202. The assistant invocation engine 222 can process this data in order to determine whether or not to wait for a user to explicitly speak an invocation phrase to invoke the automated assistant 204, or consider the data to be indicative of an intent by the user to invoke the automated assistant—in lieu of requiring the user to explicitly speak the invocation phrase.

For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 222 can cause the automated assistant 204 to detect, or limit detecting, spoken invocation phrases from a user based on features of a context and/or an environment. Additionally, or alternatively, the assistant invocation engine 222 can cause the automated assistant 204 to detect, or limit detecting for one or more assistant commands from a user based on features of a context and/or an environment. In some implementations, the assistant invocation engine 222 can be disabled or limited based on the computing device 202 detecting an assistant suppressing output from another computing device. In this way, when the computing device 202 is detecting an assistant suppressing output, the automated assistant 204 will not be invoked based on contextual data 236—which would otherwise cause the automated assistant 204 to be invoked if the assistant suppressing output was not being detected.

In some implementations, the system 200 can further include a template correlation engine 218 that can be employed by the automated assistant 204 to determine a relevance of one or more available templates to one or more inputs associated with a user. For example, a direct or indirect input from a user can be associated with a request for content to be provided by the automated assistant to the user and/or one or more other users. In response to the input, the template correlation engine 218 can identify a template that is most relevant to the request for content. For instance, the input can be associated with a request for a captioned-image to be shared with another user, and the template correlation engine 218 can identify a "captioned-image" template in response to the input. Thereafter, the automated assistant 204 can process configuration data associated with the "captioned-image" template in order to determine how to assign content to the template.

In some implementations, the system 200 can further include a template content engine 226 that processes the configuration data, input from the user(s), contextual data associated with an input, prior instances of content, and/or any other information that is suitable for use when determining the content to assign to a template. In some implementations, the template content engine 226 can use one or more trained machine learning models for processing the aforementioned information in order to determine a relevance of available content to a particular template and/or input. In this way, content that may be relevant to a particular input but not relevant to a particular template can be filtered out in order to identify certain content that is most relevant to both an input and a selected template. For example, although a request from a user may cause the automated assistant 204 to select from various "monthly reports" to attach to an instance of template-based content, the automated assistant 204 may select the "monthly report" that is most relevant to both the request and the template. Alternatively, or additionally, configuration data stored in association with a selected template can guide the template content engine 226 on how to determine a relevance of certain candidate content. Alternatively, or additionally, one or more trained machine learning models can be stored in association with a template in order that the automated assistant 204 can employ the one or more trained machine learning models when selecting and/or generating content to assign to each respective section of a respective template.

In some implementations, the system 200 can further include a content solicitation engine 228, which can determine when to prompt a user to identify and/or provide additional content for completing a particular template and/or fulfilling a request that is associated with a template. In some implementations, the content solicitation engine 228 can determine that the template content engine 226 has not identified content for a particular section of a template and, based on this determination, generate a prompt for a user to assign content to the particular section. Alternatively, or additionally, in some implementations, the content solicitation engine 228 can determine that the template content engine 226 has identified candidate content that does not satisfy a threshold for assigning certain content to a section of a template. Based on this determination, the automated assistant 204 can generate a prompt for the user to select one or more instances of content from the identified candidate content for assigning to the section of the template.

In some implementations, the system 200 can further include a template generation engine 240 that can generate a template for use when generating content in response to a direct or indirect input from a user. The template that is generated by the template generation engine 240 can be based on processing of prior instances of content that can be created at the direction of one or more users. In some implementations, the template generation engine 240 can initialize generation of a template based on determining that one or more instances of content created via one or more applications (optionally including an automated assistant) have similar features. Based on identification of these similar features, the automated assistant 204 can employ the template generation engine 240 to generate a template that includes the one or more similar features. Alternatively, or additionally, the template generation engine 240 can generate non-contiguous sections of the template to be dynamic sections or static sections, respectively, according to the one or more prior instances of the content.

In some implementations, the automated assistant 204 can employ a template annotation engine 242 for generating configuration data, annotations, and/or other information that can be stored in association with a template that is generated by the template generation engine 240. For example, the template annotation engine 242 can generate an annotation based on prior instances of content in order to indicate a source of information that a user typically accesses in order to complete a particular section of content. This generated annotation can be stored in association with a template that is based on the prior instances of content in order that the automated assistant 204 can readily identify sources of content that a user would otherwise access to generate content similar to the template. For example, in response to a user requesting that the automated assistant 204 generate complex content, the automated assistant 204 can process the configuration data in order to retrieve information from those sources.

Figure 3:
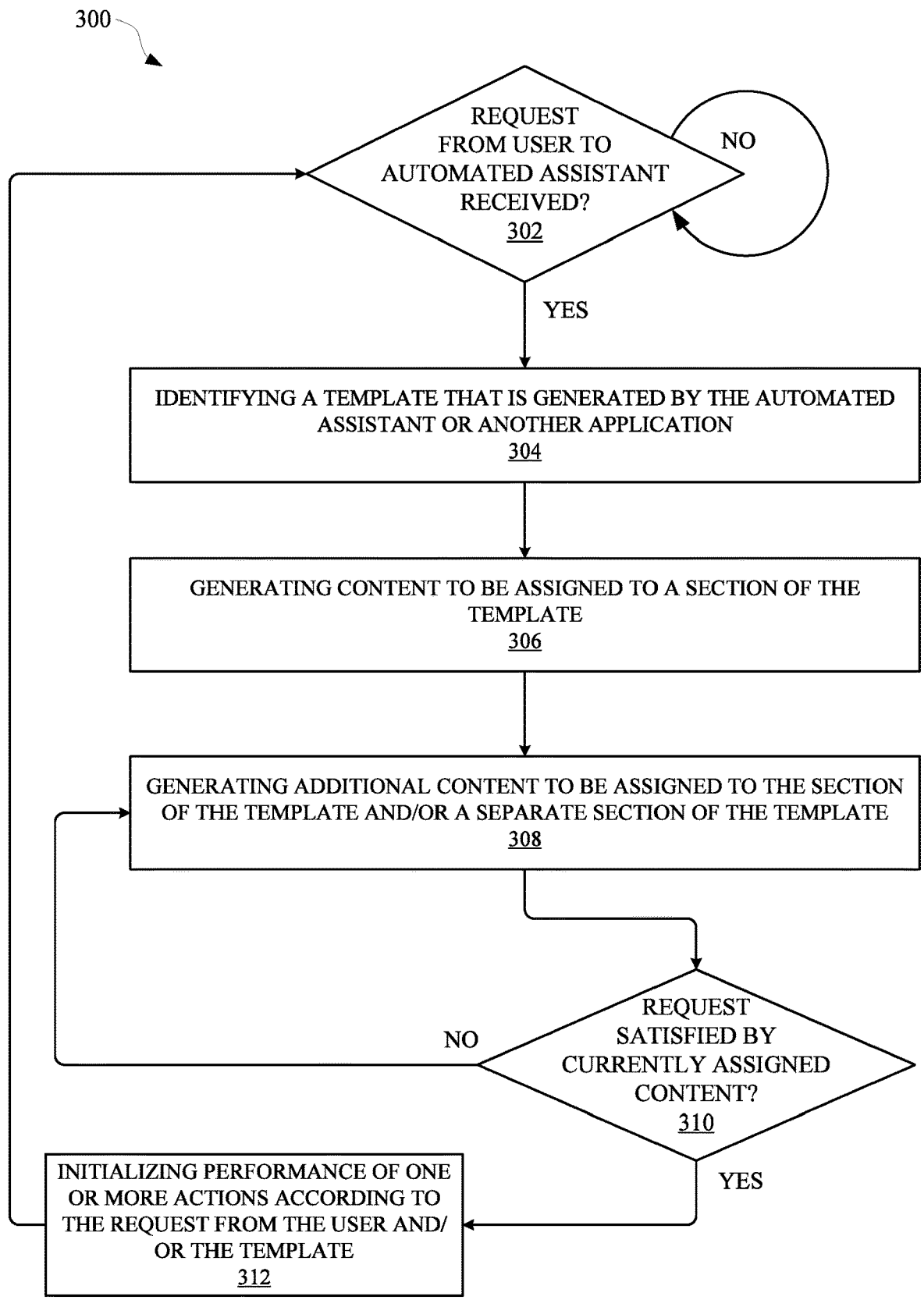
FIG. 3 illustrates a method for an automated assistant to fulfill a request from a user using a template that is generated by the automated assistant and/or another application based on other instances of content associated with the user.

FIG. 3 illustrates a method 300 for an automated assistant to fulfill a request from a user using a template that is generated by the automated assistant or another application based on other instances of content associated with the user. The method 300 can be performed by one or more computing devices, applications, and/or any other apparatus or module that can be associated with an automated assistant. The method 300 can include an operation 302 of determining whether a request from the user to the automated assistant has been received. The request can be, for example, a request for the automated assistant to communicate a message to one or more particular recipients. For instance, the user can provide, to an assistant-enabled device, a spoken utterance such as, "Assistant, send a message that includes my drum recording."

When the automated assistant determines that the request from the user has been received, the method 300 can proceed from the operation 302 to an operation 304. Otherwise the method 300 can remain at the operation 302. The operation 304 can include identifying a template that was generated by the automated assistant or another application. The template can be selected based on content of the request, data stored in association with the template, a context in which the request was provided and/or the template was generated, and/or any other information that can be associated with the template. In some implementations, because the user provided the spoken utterance with the terms "message" and "drum recording," the automated assistant can determine that the request is most relevant to a "band message" template. For example, in some implementations, the automated assistant can cause an embedding to be generated based on the request and using one or more trained machine learning models. Based on a mapping of the request in latent space, a relevance of the request to a variety of different templates can be determined. A particular template that is determined to be most relevant to the request can then be selected for fulfilling the request.

The method 300 can proceed from the operation 304 to an operation 306, which can include generating content to be assigned to a section of the template. In some implementations, the template can include one or more sections in which the automated assistant can assign content according to information associated with a request from the user. Furthermore, the automated assistant can assign content to various sections of the template without the user explicitly identifying the content. For example, in accordance with past instances in which the user generated messages that include "drum recording[s]," the automated assistant can generate natural language content for a body of a draft message, and assign the natural language content to the section of the template. The automated assistant can generate the natural language content to be similar to past messages that provided the basis for the identified template. For instance, when the past messages include variations of content such as, "Hi Everyone, Attached is a drum recording that I created after last week's practice," the automated assistant can generate similar natural language content. The natural language content can be modified according to a context of the request, for example, in order to reflect certain contingencies that may have been apparent in prior messages. For instance, when the spoken utterance from the user comes a day after a "practice" that is specified on a calendar of the user, the calendar entry of the user can be used as a basis for indicating that "practice" was yesterday and not "last week," which may have been the case for prior messages.

The method 300 can proceed form the operation 306 to an operation 308, which can include generating additional content to be assigned to the section of the template and/or a separate section of the template. In some implementations, the automated assistant can determine that additional content should be assigned to the section of the template or a separate section of the template, and then generate this additional content based on this determination. For example, the automated assistant can determine that the identified template includes a section that has no assigned content and/or insufficient content. In some implementations, the section that has no assigned content can include a reference to another template, another document, and/or any other information that can be associated with the template. Therefore, based on this reference and/or the lack of assigned content, the automated assistant can assign content to the section according to the reference that is associated with the section. For example, the automated assistant can identify a "drum recording" file that is referenced by the template and/or data stored in association with the template. An address for the file can be incorporated into the template in order that recipients of a message that is based on the template will have access to the "drum recording" file.

The method 300 can proceed from the operation 308 to an operation 310, which can include determining whether the request from the user is satisfied by content that is currently assigned to the template. When the automated assistant determines that the content currently assigned to the template is satisfactory for the request from the user, the method 300 can proceed from the operation 310 to an operation 312. Otherwise, the method 300 can return to the operation 308 in which additional content is generated and/or identified for assigning to the identified template. In some implementations, when the automated assistant determines that the content currently assigned to the template is not satisfactory for the request from the user, the automated assistant can cause a prompt to be rendered for the user. The prompt or query can be an automated assistant request for the user to provide further content for fulfilling the request from the user.

For example, when the automated assistant determines that a "drum recording" file is not available, or otherwise does not satisfy the request from the user, the automated assistant can prompt the user to identify a location of the recording file to be attached. Alternatively, or additionally, the automated assistant can suggest one or more locations for the user to choose from when multiple files are available. Alternatively, or additionally, the automated assistant can suggest that the user open a particular application for generating a suitable file for attaching to the template-based message. In some implementations, the particular application can be selected based on prior instances in which the user accessed the particular application within a period of time from when the user generated a related message (e.g., a message that includes similar content to the message that the user has requested the automated assistant to generate in the aforementioned example). Alternatively, or additionally, the particular application can be selected based on prior instances in which another user accessed the particular application within a period of time in which the other user generated a related message. When the user has interacted with the particular application to create the suitable file, the automated assistant can then identify the file location and attach the file to the template-based message that the user requested the automated assistant to generate.

The operation 312 can include initializing performance of one or more actions according to the request from the user and/or content of the template. For example, because the user provided a request to "send a message," the automated assistant can score an action of sending a message that includes the template content over other available actions. Alternatively, or additionally, the automated assistant can also score another action of changing permissions of a file (e.g., the "drum recording" file) over other available actions based on the content that has been assigned to the template that was identified in the operation 304. In this way, even though the user provided a relatively brief spoken utterance in the aforementioned example (e.g., "Assistant, send a message that includes my drum recording."), various actions can be performed in order to communicate a relatively complex message to various recipients. This can preserve computational resources that may otherwise be consumed by a user who, for example, manually compiles complex messages using one or more different interface devices and/or a desktop display screen.

Figure 4:
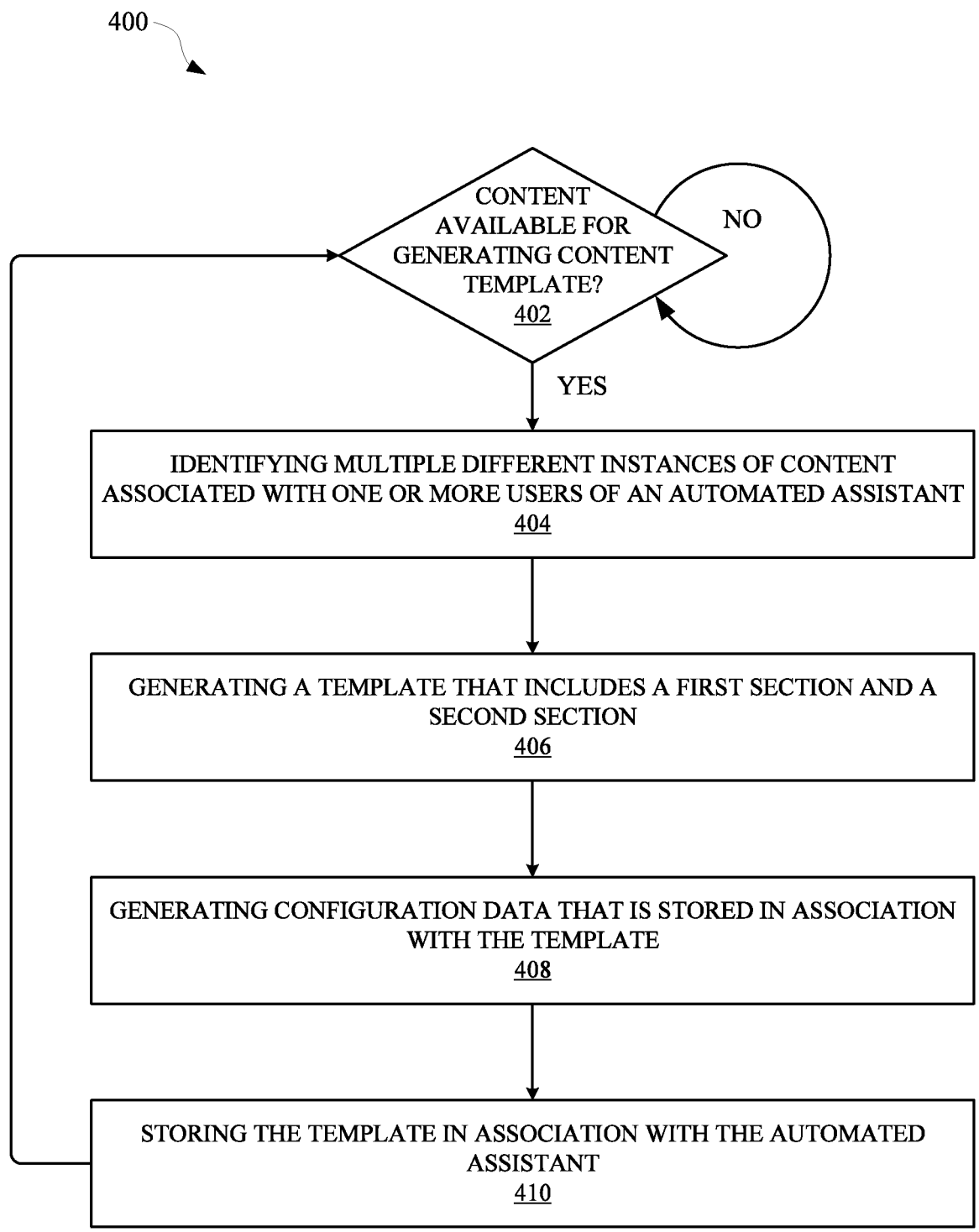
FIG. 4 illustrates a method for generating, based on other instances of content associated with a user, a content template that can be used by an automated assistant.

FIG. 4 illustrates a method 400 for generating, based on other instances of content associated with a user, a content template that can be used by an automated assistant. The method 400 can be performed by one or more computing devices, applications, and/or any other apparatus or module that can be associated with an automated assistant. The method 400 can include an operation 402 of determining whether content is available for generating a content template, which can be accessed by an automated assistant. The content that is subject to the determination of the operation 402 can include a variety of different types of content, and the variety of different types of content can be embodied in the same or different types of files. For example, the automated assistant can determine whether to generate a template based on whether a user is frequently communicating with one or more particular recipients and/or whether one or more communications generated by the user are being similarly constructed. In some implementations, when the automated assistant identifies, with prior permission from the user, multiple messages with common content being communicated to one or more recipients, the automated assistant can determine to generate a message template based on the multiple messages and/or other similar messages. In some implementations, the common content can refer to various types of content and/or can include content that varies for each instance of the multiple messages. For example, common content can refer to content that includes a common source—even though the substance of the content is not the same for every instance of the content (e.g., electrical usage data from a utility website, mileage data from an LTE-enabled vehicle, and/or any other source of dynamic data).

When the automated assistant determines that certain content is suitable for generating a content template, the method 400 can proceed from the operation 402 to an operation 404. The operation 404 can include identifying multiple different instances of content associated with one or more users of the automated assistant. For example, the automated assistant can identify one or more documents that include certain content in a subject field, body, introduction, attachment, conclusion, discussion, and/or any other portion of the documents. The documents can be selected as a corpus from which a template is at least initially based upon. The documents can then be relied upon, with prior permission from the user, by the automated assistant when the user subsequently requests that the automated assistant generate a particular document that has one or more common features of the documents of the corpus. For example, the automated assistant can process portions of documents using one or more trained machine learning models in order to generate suitable content to be incorporated into a particular template.

The method 400 can proceed from the operation 404 to an operation 406, which can include generating a template that includes a first section and a second section, which can be non-contiguous sections. In some implementations, the template can include a single section, and in other implementations the template can include two or more sections. Each section generated for the template can be created based on the multiple different instances of the content identified at the operation 404. For example, the first section that is generated for the template can be based on one or more instances of the multiple different instances of content also having a first section. In some implementations, the first section can refer to a static section of content that is not intended to change each time the automated assistant uses the template. However, the static section can be assigned content that is selected from one or more different candidate instances of content based on a request from a user, a context of the request, data stored in association with the template, and/or any other information that can be associated with the template. Alternatively, or additionally, the second section can refer to a dynamic section of content whose assigned content may or may not change each time the automated assistant uses the template. For example, the dynamic section can be assigned particular content that is based on one or more sources of dynamic content (e.g., a website, an application, a separate user, another automated assistant, and/or any other source of content). Therefore, content that is stored with the template can be retrieved from a dynamic content source, which can cause the content of the template to be rendered differently each time the automated assistant uses the template.

The method 400 can further include an operation 408 of generating configuration data that is stored in association with the template. In some implementations, the configuration data can refer to annotation data, comment data, and/or any other data that can be stored in association with the template. The configuration data can optionally indicate that a first type of content is to be assigned to the first section of the template and a second type of content is to be assigned to the second section of the template. Furthermore, the first type of content can optionally be different or the same as the second type of content. In some implementations, the configuration data can indicate a respective source for a respective type of data, and the respective source can be a particular source that is identified in one or more of the instances of content upon which the template is based. For example, when the template is based on multiple prior messages drafted by the user and received by a recipient, the automated assistant can determine that at least two of the prior messages have one or more shared features. Additionally, the automated assistant can determine a source of data that the one or more shared features are based on. This source of data can then be characterized by the configuration data when the automated assistant generates the configuration data at the operation 408.

Alternatively, or additionally, the automated assistant can determine that features of the instances of content that form the basis for a template do not share certain features. For example, although a first message can share one or more features with a second message, the first message can include a sentence mentioning an aspect of the news, whereas the second message does not mention the aspect of the new. The automated assistant can determine that this feature corresponds to a particular condition, and the condition can be characterized by the configuration data. In some implementations, the particular condition can be whether a particular source of data has certain data available. For instance, the particular condition for a message can be based on whether a website has updated information (e.g., updated weather information)—at least relative to a previous instance in which the website was accessed to generate a previous message.

In some implementations, the configuration data can indicate that certain portions of the template are based on a context in which the user provides a request to generate content associated with the template. For example, the configuration data can indicate that phraseology of natural language content to be assigned to a certain section of the template can be based on the context of a request from a user. Alternatively, or additionally, the configuration data can indicate that verbiage and/or vocabulary of natural language content to be assigned to a certain section of the template can be based on the context of the request from a user. For example, in some instances the configuration data can indicate that when a user requests that the automated assistant generate a message for certain recipients, the phraseology for the content of the message can be selected based on those certain recipients. As a result, certain terms and/or a number of terms that are assigned to a particular template section can vary according to certain contextual features of a request from a user and/or configuration data that is stored in association with the particular template.

The method 400 can optionally include an operation 410 of storing the template in association with the automated assistant. In this way, the automated assistant can access the template in response to a request from one or more users to perform one or more actions associated with the template. In some implementations, the template can be generated without a user explicitly requesting that the automated assistant generate the template (with prior permission from the user to access the information that is used to create the template).

Figure 5:
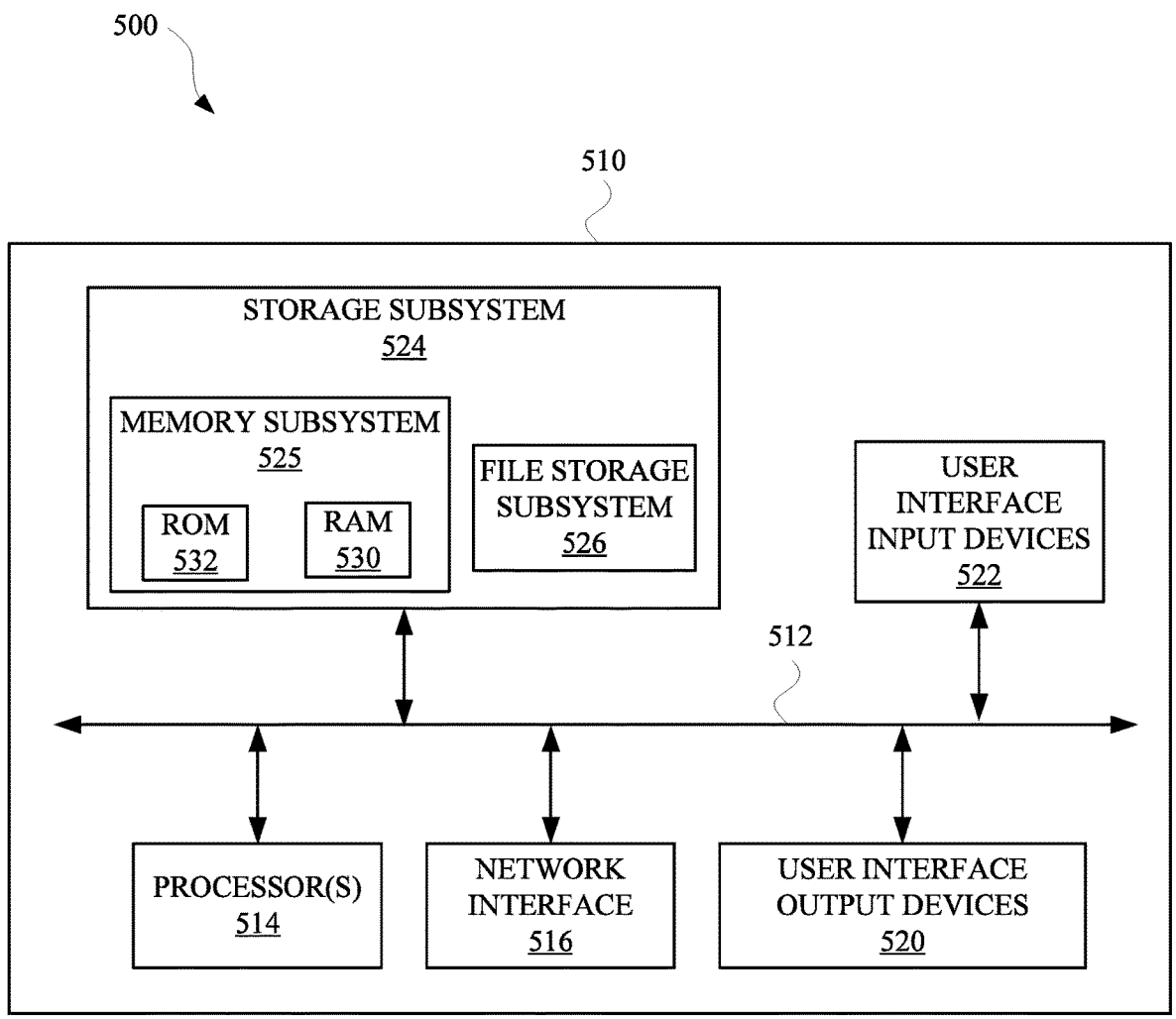
FIG. 5 is a block diagram of an example computer system.

FIG. 5 is a block diagram 500 of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 300 and method 400, and/or to implement one or more of system 200, computing device 108, and/or any other application, device, apparatus, and/or module discussed herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as receiving, at a computing device and from a user, a user input that includes a request for an automated assistant to generate a message to be communicated to a recipient. The method can further include an operation of identifying, based on receiving the user input, a particular message template from multiple different message templates, wherein each message template of the multiple different message templates is based on one or more prior messages drafted by the user. The method can further include an operation of determining, based on the particular message template, whether content of the user input is sufficient for the automated assistant to complete the message template. The method can further include an operation of, when the content of the user input is determined to be sufficient for completing the message template: causing a portion of the content to be assigned to a first portion of the particular message template, and causing other natural language content, that is not embodied in the content of the user input, to be incorporated into a second portion of the particular message template.

In some implementations, the method can further include an operation of, when the content of the user input is determined to be insufficient for completing the message template: causing the automated assistant to render a request for the user to provide other content in furtherance of completing the particular message template using the other content, and receiving, from the user, additional content that is responsive to the request from the automated assistant. In some implementations, causing the automated assistant to render the request for the user to provide the other content includes: generating one or more queries, wherein each query of the one or more queries corresponds to a respective additional portion of the particular message template that is not assigned particular content, and wherein the request rendered by the automated assistant embodies the one or more queries.

In some implementations, causing the other natural language content, that is not embodied in the content of the user input, to be incorporated into the second portion of the particular message template includes: automatically generating the other natural language content based on one or more previous interactions between the user and one or more messaging applications, wherein each interaction of the one or more previous interactions occurred before the user input that includes the request for the automated assistant to generate the message, and wherein each interaction involved the user causing a previous respective message to be drafted via the one or more messaging applications. In some implementations, causing the other natural language content, that is not embodied in the content of the user input, to be incorporated into the second portion of the particular message template includes: generating the other natural language content based on one or more previous interactions between one or more other users and one or more messaging applications, wherein each interaction of the one or more previous interactions occurred before the user input that includes the request for the automated assistant to generate the message, and wherein each interaction involved the one or more other users causing a previous respective message to be drafted via the one or more messaging applications.

In some implementations, causing the other natural language content, that is not embodied in the content of the user input, to be incorporated into the second portion of the particular message template includes: generating the other natural language content based on one or more previous interactions between one or more other users and one or more messaging applications, wherein each interaction of the one or more previous interactions occurred before the user input that includes the request for the automated assistant to generate the message, and wherein each interaction involved the user, or one or more other users, causing a respective message to be drafted via the automated assistant or another automated assistant. In some implementations, causing the other natural language content, that is not embodied in the content of the user input, to be incorporated into the second portion of the particular message template includes: identifying one or more terms to incorporate into the second portion of the particular message template, and generating the other natural language content based on one or more trained machine learning models and the one or more terms, wherein the other natural language content embodies the one or more terms and one or more additional terms, and wherein the one or more additional terms are based on prior messages previously communicated between the user and the recipient.

In other implementations, a method implemented by one or more processors is set forth as including operations such as identifying, by an automated assistant or application associated with the automated assistant, multiple different instances of content associated with a user of the automated assistant, wherein the multiple different instances of content are identified based on one or more shared features of at least a first instance of content and a second instance of content of the multiple different instances of content. The method can further include an operation of generating, based on the one or more shared features, a template that includes a first section and a second section, wherein the template is accessed by the automated assistant in response to the user subsequently providing a request for the automated assistant to create another instance of content. The method can further include an operation of generating, based on the one or more shared features, configuration data that is stored in association with the template, wherein the configuration data indicates that a first type of content is to be assigned to the first section of the template in response to the request, and a second type of content is to be assigned to the second section of the template in response to the request, and wherein the second type of content is different from the first type of content. The method can further include an operation of storing the template in association with the automated assistant.

In some implementations, generating the template that includes the first section and the second section includes: identifying, based on the multiple different instances of content, a first source of data for the first type of content and a second source of data for the second type of content, wherein the first source of data is different from the second source of data. In some implementations, identifying the first source of data includes: determining that the one or more shared features of at least the first instance of content and the second instance of content include particular content that is based on the first source of data. In some implementations, generating the configuration data that is stored in association with the template includes: determining, based on the multiple different instances of content, whether one or more particular features that are unshared between the first instance of content and the second instance of content are affected by a particular condition, wherein the configuration data characterizes the particular condition.

In some implementations, the particular condition is based upon certain content that is dynamically updated from a particular source of data that is separate from the automated assistant. In some implementations, the multiple different instances of content are messages from the user to a particular recipient, and wherein generating the configuration data that is stored in association with the template includes: determining that a context, in which the user generated a particular message of the messages, affected a phraseology of the particular message, wherein the configuration data characterizes a correspondence between the context and content phraseology of certain content to be incorporated into the template in response to a subsequent request from the user. In some implementations, the content phraseology corresponds to a verbiage of the certain content, and the configuration data directs the automated assistant to modify the verbiage of the certain content according to a temporal aspect of a subsequent context of the subsequent request from the user. In some implementations, the content phraseology corresponds to a vocabulary of the certain content, and the configuration data directs the automated assistant to: select a first vocabulary for the certain content when the subsequent request from the user is provided in a first context, and select a second vocabulary for the certain content when the subsequent request from the user is provided in a second context that is different than the first context.

In yet other implementations, a method implemented by one or more processors is set forth as including operations such as receiving, by an automated assistant, a spoken utterance corresponding to a request for the automated assistant to perform one or more particular actions associated with a template. The method can further include an operation of identifying, based on the spoken utterance, a particular template that includes a first section and a second section, wherein the first section and the second section correspond to non-contiguous portions of the particular template. The method can further include an operation of identifying, based on the spoken utterance, content to be assigned to the first section of the particular template. The method can further include an operation of generating, based on the content assigned to the first section, additional content to be assigned to the second section of the particular template, wherein the additional content is different from the content to be assigned to the first section of the particular template. The method can further include an operation of determining whether inclusion of the content and the additional content completes the particular template. The method can further include an operation of, when the inclusion of the content and the additional content is determined to complete the particular template: causing the automated assistant to perform the one or more particular actions using the template with at least the content and the additional content.

In some implementations, the method can further include an operation of, when the inclusion of the content and the additional content is determined to not complete the particular template: causing the automated assistant to identify an additional portion of the template that does not correspond to the content and the additional content, and causing the automated assistant to render an output requesting that a user provide supplemental content to assign to the additional portion of the template. In some implementations, generating the additional content to be assigned to the second section of the particular template includes: identifying one or more annotations associated with the first section of the template, wherein the one or more annotations are based upon one or more prior instances in which a user employed one or more applications for generating certain content. In some implementations, determining whether inclusion of the content and the additional content completes the particular template includes: processing currently assigned template content using one or more trained machine learning models that are trained based on instances of content upon which the particular template is based. In some implementations, identifying the content to be assigned to the first section of the particular template includes: processing natural language content of the spoken utterance using one or more trained machine learning models that are trained based on instances of content upon which the particular template is based, and determining, based on the processing of the natural language content, a relevance of natural language content of the spoken utterance to one or more instances of candidate content associated with the particular template, and wherein the content includes at least one instance of candidate content of the one or more instances of candidate content.

What is claimed is:

1. A method implemented by one or more processors, the method comprising:
   receiving, at a computing device and from a user, a user input, the user input being a spoken utterance that includes a request for an automated assistant to generate a message to be communicated to a recipient;
   identifying, based on receiving the user input, a particular message template from multiple different message templates,
      wherein each message template of the multiple different message templates is based on one or more prior messages drafted by the user;
   determining, based on the particular message template, whether content of the user input is sufficient for the automated assistant to complete the particular message template, wherein the content of the user input is determined by processing the spoken utterance, and wherein the user input is received prior to identifying the particular message template; and
   when the content of the user input is determined to be sufficient for completing the particular message template:
      causing a portion of the content to be assigned to a first portion of the particular message template, and
      causing other natural language content, that is not embodied in the content of the user input, to be incorporated into a second portion of the particular message template,
         wherein the particular message template, with the first portion filled using the portion of the content and the second portion filled using the other natural language content, is displayed to the user via a display of the computing device, responsive to receiving additional user input from the user to review the message,
         wherein causing the other natural language content, that is not embodied in the content of the user input, to be incorporated into the second portion of the particular message template includes:
            identifying one or more terms to incorporate into the second portion of the particular message template, and
            generating the other natural language content based on one or more trained machine learning models and the one or more terms,
         wherein the other natural language content embodies the one or more terms and one or more additional terms, and
         wherein the one or more additional terms are based on prior messages previously communicated between the user and the recipient.

2. The method of claim 1, further comprising:
   when the content of the user input is determined to be insufficient for completing the particular message template:
      causing the automated assistant to render a request for the user to provide other content in furtherance of completing the particular message template using the other content, and
      receiving, from the user, additional content that is responsive to the request from the automated assistant.

3. The method of claim 2, wherein causing the automated assistant to render the request for the user to provide the other content includes:
   generating one or more queries,
      wherein each query of the one or more queries corresponds to a respective additional portion of the particular message template that is not assigned particular content, and
      wherein the request rendered by the automated assistant embodies the one or more queries.

4. The method of claim 1, wherein the spoken utterance further includes a request for the automated assistant to perform an action associated with the message.

5. The method of claim 4, further comprising:
   when the content of the user input is determined to be sufficient for completing the particular message template: causing a dynamic section of the particular message template to be modified to satisfy the request to perform the action.

6. The method of claim 5, wherein the dynamic section is a document address field for attaching a document.

7. The method of claim 1, further comprising:
   determining, based on the spoken utterance and the particular message template, whether to incorporate language that corresponds to a certain tone.

8. The method of claim 7, wherein the certain tone is an urgent tone or a non-urgent tone.

9. A method implemented by one or more processors, the method comprising:
   receiving, at a computing device and from a user, a single spoken utterance of the user that includes a request for an automated assistant to generate a message to be communicated to a recipient;
   identifying, based on content of the request, a particular message template from multiple different message templates,
      wherein each message template of the multiple different message templates is based on one or more prior messages drafted by the user;
   determining whether natural language content, of the single spoken utterance that is received prior to identifying the particular message template, is sufficient for the automated assistant to complete the identified particular message template, wherein the natural language content of the spoken utterance is determined by processing the spoken utterance; and when the natural language content, of the single spoken utterance that is received prior to identifying the particular message template, is determined to be sufficient for completing the identified particular message template:

causing a portion of the natural language content of the single spoken utterance to be assigned to a first portion of the particular message template, and causing other natural language content, that is not embodied in the natural language content of the single spoken utterance, to be incorporated into a second portion of the particular message template wherein causing the other natural language content, that is not embodied in the content of the user input, to be incorporated into the second portion of the particular message template includes:

identifying one or more terms to incorporate into the second portion of the particular message template, and generating the other natural language content based on one or more trained machine learning models and the one or more terms, wherein the other natural language content embodies the one or more terms and one or more additional terms, and wherein the one or more additional terms are based on prior messages previously communicated between the user and the recipient.

10. The method of claim 9, further comprising:
when the natural language content of the spoken utterance is determined to be insufficient for completing the particular message template:

causing the automated assistant to render a request for the user to provide other content in furtherance of completing the particular message template using the other content, and receiving, from the user, additional content that is responsive to the request from the automated assistant.

11. The method of claim 10, wherein causing the automated assistant to render the request for the user to provide the other content includes:

generating one or more queries, wherein each query of the one or more queries corresponds to a respective additional portion of the particular message template that is not assigned particular content, and wherein the request rendered by the automated assistant embodies the one or more queries.

12. The method of claim 9, wherein the spoken utterance further includes a request for the automated assistant to perform an action associated with the message.

13. The method of claim 12, further comprising:
when the content of the user input is determined to be sufficient for completing the particular message template: causing a dynamic section of the particular message template to be modified to satisfy the request to perform the action associated with the message.

14. The method of claim 13, wherein the dynamic section is a document address field for attaching a document.

15. The method of claim 9, further comprising:
determining, based on the spoken utterance and the particular message template, whether to incorporate language that corresponds to an urgent tone.

16. A method implemented by one or more processors, the method comprising:

receiving, at a computing device and from a user, a user input that includes a request for an automated assistant to generate a message to be communicated to a recipient;

identifying, based on receiving the user input, a particular message template from multiple different message templates, wherein each message template of the multiple different message templates is based on one or more prior messages drafted by the user;

determining whether content of the user input is sufficient for the automated assistant to complete the particular message template, wherein the user input is received prior to identifying the particular message template; and when the content, of the user input that is received prior to identifying the particular message template, is determined to be sufficient for completing the particular message template:

causing a portion of the content to be assigned to a first portion of the particular message template, and causing other natural language content, that is not embodied in the content of the user input, to be incorporated into a second portion of the particular message template, wherein causing the other natural language content, that is not embodied in the content of the user input, to be incorporated into the second portion of the particular message template includes:

identifying one or more terms to incorporate into the second portion of the particular message template, and generating the other natural language content based on one or more trained machine learning models and the one or more terms, wherein the other natural language content embodies the one or more terms and one or more additional terms, and wherein the one or more additional terms are based on prior messages previously communicated between the user and the recipient.

17. The method of claim 16, further comprising:
when the content of the user input is determined to be insufficient for completing the particular message template:

causing the automated assistant to render a request for the user to provide other content in furtherance of completing the particular message template using the other content, and receiving, from the user, additional content that is responsive to the request from the automated assistant.

18. The method of claim 16, wherein the spoken utterance further includes a request for the automated assistant to perform an action associated with the message.

19. The method of claim 18, further comprising:
when the content of the user input is determined to be sufficient for completing the particular message template: causing a dynamic section of the particular message template to be modified to satisfy the request to perform the action associated with the message.

20. The method of claim 16, further comprising:
  determining, based on the spoken utterance and the particular message template, whether to incorporate language that corresponds to an urgent tone.

\* \* \* \* \*